United States Patent [19]

Genske et al.

[11] Patent Number: 4,764,404
[45] Date of Patent: Aug. 16, 1988

[54] FILMS HAVING A POLYPROPYLENE BLEND LAYER

[75] Inventors: Roger P. Genske; Yong J. Kim, both of Neenah, Wis.

[73] Assignee: American National Can Company, Chicago, Ill.

[21] Appl. No.: 802,910

[22] Filed: Nov. 29, 1985

[51] Int. Cl.$^4$ .............. B65D 75/00; B32B 27/08
[52] U.S. Cl. .................. 428/35; 428/461; 428/463; 428/476.4; 428/475.5; 428/475.8; 428/516; 428/518; 428/519; 428/425.8; 428/424.8
[58] Field of Search .............. 428/35, 461, 476.1, 428/463, 475.5, 475.8, 516, 518, 519

[56] References Cited

U.S. PATENT DOCUMENTS 3,937,758 2/1976 Castagna .................. 260/876 B
4,147,827 4/1979 Breidt, Jr et al. .................. 428/517
4,311,807 1/1982 McCullough, Jr. et al. ....... 525/197
4,405,667 9/1983 Christensen et al. ................ 428/35
4,407,877 10/1983 Rasmussen ........................ 428/905

FOREIGN PATENT DOCUMENTS 0092897 11/1983 European Pat. Off. .

*Primary Examiner*—P. C. Ives
*Attorney, Agent, or Firm*—Paul R. Audet; Thomas D. Wilhelm

[57] ABSTRACT

This invention pertains to blends of a first component of a polypropylene, a second component of an ethylene-based copolymer, and a third component which provides some properties representative of elastomeric polymers. The blends are useful in making single and multiple layer sheet structures. The invention further contemplates packages made from sheet structures incorporating layers of the blends therein.

19 Claims, 2 Drawing Sheets

FILMS HAVING A POLYPROPYLENE BLEND LAYER

BACKGROUND OF THE INVENTION

The packaging industry makes and uses many sheet structures in the making of heat sealed packages. Such packages find use in a multiplicity of applications. Of particular interest to the invention herein are those applications where the finished package may be subjected to relatively abusive physical shocks, as by being dropped, bumped, or the like. In cases where the package contains fluid components, the shock may be transferred to all parts of the package by the contained fluid. The transferred shock is effective to cause failure of the package at its weakest point when the severity of shock is sufficiently great.

Heat sealed packages tend to fail at or close to a heat seal. Typical failures occur by partial peeling of the facing sealant layers from each other in the seal area. Where the shock is severe enough, the package may have a catastrophic failure wherein the package may be penetrated to the outside.

Such failure of the package, whether by partial peeling or by catastrophic failure, compromises the containment and protective functions of the package, and is thus not acceptable. It is desirable to find material compositions which may be used in packaging sheet structures which compositions enhance the capability of the sheet structure, and particularly the sealant layer, to withstand increased amounts of shock-type abuse.

In certain packaging applications, the packages are subjected to heat treatment at elevated temperatures of up to about 250° F. as part of the packaging process. Such heat treatments are common in certain packaging of medical supplies and shelf stable foods.

Some polymers, such as polypropylene, which are otherwise excellent for use with high temperature applications, tend to become more brittle after being subjected to such heat treatments. Increasing brittleness leads to less ability to resist shock type abuse. While the use of such materials is desirable for their ability to withstand heat treatment without failure of the package during the heat treatment, the resulting brittleness is an undesirable feature as affects its ability to withstand the shocks of, for example, shipping and handling.

It is an objective of this invention to provide novel material blend compositions.

It is further object of this invention to provide single layer films and multiple layer films and sheet structures, incorporating therein the novel compositions, for use in making packages, and particularly heat sealed packages.

Yet another object is to provide heat sealed packages capable of withstanding increased amounts of physical shock type abuse, especially after the closed and sealed package has been subjected to elevated temperatures of up to about 250° F.

SUMMARY OF THE DISCLOSURE

These and other objectives are obtained in the novel compositions, films, sheet structures, and packages of the invention. In the novel blend compositions, a first component of the blend is a polypropylene polymer. The second component is an ethylene-based copolymer which consists essentially of ethylene copolymerized with moieties of a second molecule, the composition of said second molecule being selected from the group consisting of propylene and butene-1. (Hereinafter, said ethylene-based copolymers are sometimes referred to as "EBC"). Preferably the EBC consists essentially of an ethylene copolymerized with moieties of a second molecule, the copolymer being about 10 to about 95 mole percent ethylene and about 90 to about 5 mole percent of the moieties of the second molecule, the composition of the second molecule being selected from the group of consisting propylene and butene-1. A third component of the blend is an EBC or another elastomeric polymer. (Hereinafter in this application and claims, the aforesaid third component group of materials is sometimes referred to as the "Third Component".)

Preferably, the second component is present in an amount of about 5% to about 35% by weight of the overall composition of the blend.

In one preferred embodiment, the ethylene-based copolymer is essentially a copolymer of about 85 to about 95 mole percent ethylene and about 15 to about 5 mole percent butene-1.

In another preferred embodiment, the ethylene-based copolymer is essentially a copolymer of about 60 to about 80 mole percent ethylene and about 40 to about 20 mole percent propylene.

Turning now to the blend as a whole, it is preferred that the first component be present in an amount of about 40% to about 70% by weight of the overall composition of the blend, and that the third component be present in an amount of about 10% to about 40% by weight. It is preferred that the composition of the third component be selected from the group of elastomers comprising polybutylene, polyisobutylene, ethylene propylene diene monomer terpolymer, styrene butadiene styrene copolymer, styrene ethylene butylene styrene copolymer, polybutene-1, styrene isoprene styrene copolymer, isobutylene isoprene copolymer, or from the EBC group.

In one family of preferred overall compositions, the first component is present in an amount of about 40% to about 70% by weight, the second component is present in an amount of about 5% to about 35% by weight, and the third component is present in an amount of about 10% to about 40% by weight. In that family of preferred overall compositions, the composition of the third component is selected from the group consisting of styrene butadiene styrene copolymer, styrene ethylene butylene styrene copolymer, styrene isoprene styrene copolymer, and polyisobutylene.

The invention is also seen to be embodied in single layer films and multiple layer sheet structures made using the novel compositions of the invention.

In one multiple layer sheet structure of the invention, a first layer is made of metal foil, and has two opposing surfaces on opposing sides of the foil layer. A second layer of an abuse resistant polymer is adhered to one of the surfaces on one side of the foil. A third layer is adhered to the sheet structure on the other side of the foil layer. The composition of the third layer is of one of the novel blends of the invention.

In another multiple layer sheet structure of the invention, a first layer is made of a polyamide having two opposing surfaces on opposing sides of the polyamide layer. A second layer of an ethylene vinyl alcohol copolymer has two opposing surfaces. One surface of the second layer is on one surface on one side of the first layer. A third layer of a polyamide is on the other surface of the second layer opposite the first layer. A fourth layer is adhered to the sheet structure on the other side of the first layer. The composition of the fourth layer is one of the novel blends of the invention.

In yet another multiple layer sheet structure of the invention, a first layer is made of a barrier material having two opposing surfaces, on opposing sides of the first layer, the composition of the first layer being a vinylidene chloride copolymer. A second layer is made of an abuse resistant polymer adhered to one surface on one side of the first layer. A third layer is adhered, in the sheet structure, on the other side of the first layer. The composition of the third layer is one of the novel blends of the invention.

Packages, which may or may not be heat sealed, may also be made of the films and sheet structures of the invention.

DETAILED DESCRIPTION OF THE ILLUSTRATED EMBODIMENTS

The invention encompasses a plurality of forms and embodiments. In its most generic form, it is a composition of matter formed by the intimate blending together of the blend components. It may also be represented by a variety of articles which can be formed such as by molding or extruding the blend composition. A preferred form of article so fabricated is a single layer packaging film which may be formed by conventional extrusion process. Such films are typically thin and flexible, being of the order of about 1 mil to about 8 mils thick. Thicker sections and shapes may also be formed, as for other uses.

Other preferred embodiments of the invention are those where the blend composition is used to form one layer of a multiple layer sheet structure. Representative of these sheet structures are those illustrated in FIGS. 1-4. Other sheet structures are possible, and contemplated.

Figure 1:
FIG. 1 is a cross-section of a portion of a 2-layer film of the invention.

Turning now to FIG. 1, layer 12 is a layer of a novel blend composition embodied in the invention. Layer 14 is a layer of an abuse resistant polymer, such as polypropylene.

Figure 2:
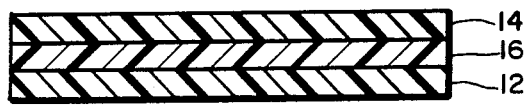
FIG. 2 is a cross-section of a portion of a 3-layer sheet stucture of the invention, and using a layer of a metal foil as a barrier layer.

The structure of FIG. 1 illustrates a simpler form of packages of the invention. It is advantageous in its simplicity, and may find use in applications where high levels of protection from gaseous infusion are not so important.

Where protection from gaseous infusion is more important, a layer of a barrier material is used. In the structure of FIG. 2, layer 16 is a layer of metal foil, which provides an excellent barrier to gaseous infusion. Layer 14 is a layer of an abuse resistant polymer as in FIG. 1. Layer 12 is a layer of a blend composition of the invention.

The structure of FIG. 2 is representative of a sheet structure useful in making retortable pouches. Such structures may also be used for applications where the package is not subjected to retort conditions. In those cases, the specific materials selected for each layer need not be evaluated in terms of their ability to withstand the retorting process. Typical problems encountered in retort processing are excessive softening during the processing, or embrittlement resulting from the processing. The foil layer 16 of such a retortable package is commonly 28 gauge to 100 gauge, with the thinner gauges being preferred for economic reasons. The abuse resistant layer 14 may be any of the conventionally known abuse resistant polymers. These include, for example, nylon, oriented nylon, oriented polypropylene, and oriented polyester. For use in retort packaging, layer 14 is typically about 50 gauge, with a range of about 25 gauge to about 100 gauge. It is conventionally known to achieve adhesion between the foil layer 16 and abuse resistant layer 14 by means of adhesives such as polyester urethane curing type adhesives. These adhesives are acceptable for such use herein.

The blend layer 12 may be any of the blend compositions of the invention. The FIG. 2 structure is designed such that layer 12 may be used as a heat seal layer. A minimum thickness for achieving strong heat seals is about 1 mil; so that is a preferred minimum thickness. Thicker heat seal layers may advantageously provide more efficient use in heat seal material, up to about 4 mils; and that is a generally preferred maximum thickness. While layer 12 may be much thicker, for example about 8 or more mils, and same is encompassed by the scope of the invention, no material benefit is usually seen to be derived from the use of the additional material; so the greater thicknesses are not generally preferred.

Layer 12 may be adhered to layer 16 by a conventional polyester urethane curing type adhesive. Alternately, adhesion may be achieved by other methods such as by extrusion lamination, coextrusion lamination, or extrusion coating followed by heat and pressure at a hot nip. In some instants, it may be desirable to use a primer on the surface of foil layer 16 before adhering layers 12 and 16 to each other.

Figure 3:
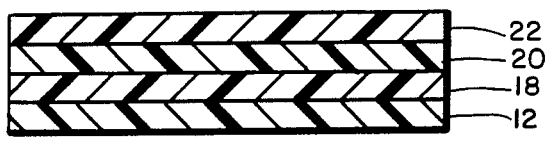
FIG. 3 is a cross-section of a portion of a 4-layer film of the invention.

Turning next to FIG. 3, layer 12 is a blend composition of the invention as in FIGS. 1 and 2. Layer 18 is a polyamide. Layer 20 is an ethylene vinyl alcohol copolymer. Layer 22 is a polyamide.

The structure of FIG. 3 represents generically a family of sheet structures which provide effective barrier to transmission of oxygen through the sheet structure while affording transparency of the packaging material for visibility of the packaged contents. These packages do have a variety of uses; and the selection of specific polymers and combinations of polymers depends on the particular use contemplated. A typical use is, as for the structure of FIG. 2, that of retort packaging.

It is known to coextrude a multiple layer film structure wherein a layer of ethylene vinyl alcohol copolymer is between two layers of polyamide. Such a structure is seen in the substructures of layers 18, 20 and 22. It has been found further acceptable to include layer 12 as part of the coextrusion. Thus, the structure of FIG. 3 may be advantageously and economically produced in a single processing step by coextruding all four layers simultaneously and combining them in the coextrusion process to form the multiple layer sheet structure.

For enhanced adhesion between layers 12 and 18, it is sometimes desirable to include an adhesive, such as an adhesive polymer, between layers 12 and 18. Such materials are conventionally known and may be selected based on the specific compositions of layers 12 and 18 and the process to be used. Typical of these adhesive polymers are those based on polypropylene and having carboxyl modifications thereto, such as maleic acid or maleic anhydride.

The structure may, of course, be made by other processes but they generally will be more expensive, and thus those processes are less preferred. Illustrative of these is adhesive lamination wherein the layers may be joined by using, for example, polyester urethane curing type adhesive.

The term polyamide, as used in describing the compositions of layers 18 and 22 is intended to include copolymers and alloys of polyamide as a major component. Likewise, additives which are normally used with polyamide are acceptable herein and are thus included in the compositions of layers 18 and 22. While the compositions of layers 18 and 22 are usually the same, to facilitate coextrusion of the sheet material, they may be different and the process adapted accordingly.

The term ethylene vinyl alcohol copolymer as used in describing the composition of layer 20, is intended to include blends of ethylene vinyl alcohol with other polymers. Likewise, additives which are normally used with ethylene vinyl alcohol copolymer are acceptable herein and are thus included in the composition of layer 20.

The term "elastomeric" includes polymers, copolymers, rubbers, and the like which at room termperature can be stretched substantially under low stress and, upon immediate release of the stress, have the tendency to return generally to approximately the original shape.

The blend layer 12 may be any of the blend compositions of the invention. The FIG. 3 structure, as in FIGS. 1 and 2, is designed such that layer 12 may be used as a heat seal layer. A minimum thickness for achieving strong heat seals is likewise about 1 mil in this structure; so that is a preferred minimum thickness. Thicker heat seal layers may advantageously provide more efficient use of the heat seal material, up to about 4 mils; so that is a generally preferred maximum thickness. Layer 12 may also be thicker, as described for the corresponding layer 12 in FIG. 2.

Layer 12 may also be less than 1 mil thick, as, for example, in all the illustrated embodiments, where heat seals are not used or seal strength is not critical.

Figure 4:
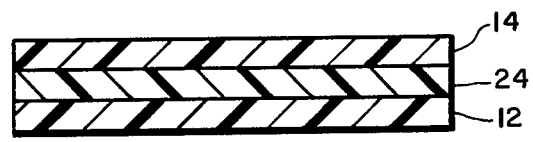
FIG. 4 is a cross-section of a portion of another 3-layer film of the invention, and using a polymeric barrier material as the internal layer.

Turning now to FIG. 4, layer 14 is an abuse resistant layer as in FIG. 2. Layer 12 is of a blend composition of the invention as in FIGS. 1-3. Layer 24 is an oxygen barrier layer such as vinylidene chloride copolymer. Preferred copolymers are vinylidene chloride-vinyl chloride copolymer and vinylidene chloride-methylacrylate copolymer. In the FIG. 4 structure, layer 24 is usually of a thickness of 0.3 to 2.0 mil, depending primarily on the rate of oxygen transmission which is desired for any given end use. While adhesion may be acheived by other means, suitable adhesives, such as the polyester urethane curing adhesives, are usually economically used between the respective layers 12, 24, and 14 to achieve good adhesion between the layers.

For constructing the sheet structure of FIG. 4, layers 12, 24, and 14 are usually formed separately from each other and then combined into the multiple layer structure shown, by conventional techniques for combining polymer films. In a typical process, the layers are joined by conventional adhesive lamination techniques.

As is now evident from the plurality of the multiple layer structures illustrated above, the blend composition of polypropylene and the second and third components has useful advantage in a variety of multiple layer structures. Indeed a layer of the blend composition may advantageously be used in combination with any other layer which may be adhered to it. Thus the multiple layer embodiment of the invention may be generically defined as a multiple layer sheet material wherein the composition of at least one layer is comprised of a blend of polypropylene and the second and third components; and wherein the composition of the other layer or layers need not necessarily be restricted except for purposes of obtaining interlayer adhesion acceptable to the intended use. Thus non-polymeric materials, such as paper and metal foil, and the like, may be used, as well as polymeric materials.

Figure 5:
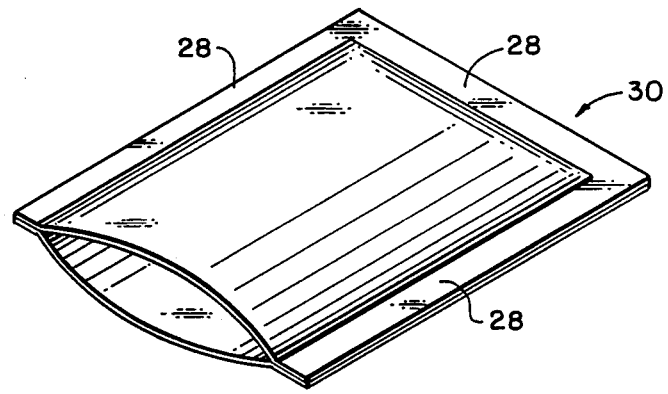
FIG. 5 is a pictorial view of a typical pouch made in the invention.

The multiple layer sheet structures of the invention are advantageously formed into packages using heat seals, as illustrated in FIG. 5. Typically, portions of the sheet material are brought into face-to-face relationship, with the layers 12 on each portion facing the opposing sheet portion. Heat seals 28 are then formed between the sheet portions about a common periphery to form a container 30 that generally defines an enclosed area. Usually, one side of the thus formed package is left open, as shown, for insertion of the product. Finally, the filled package is closed and sealed by a heat seal along the open side.

Alternately, the sheet may be formed into a tube by forming a longitudinal seal along overlapping edges; and a transverse seal is also formed across the width of the tube; all as described, for example, in U.S. Pat. No. 4,521,437, herein incorporated by reference. This process is particularly suitable for use in vertical form, fill and seal machines.

In overcoming the primary problem of brittleness of the polypropylene in flexible packages, as addressed herein, a number of factors work together in combination. Important to achievement of the objectives of the invention is incorporation, into the blend composition, of the second component and the third component as hereinbefore described. The combined contribution of the second and third components is evidenced by substantially fewer structural failures in the films, sheet structures, and packages made therefrom apparently a result of the second and third components providing, to the blend composition, stress properties characteristic of elastomers.

The ethylene-based copolymer of the second component is essentially a copolymer of two moieties, both moieties being present in the main chain of the polymer. The overall mole ratio is about 10 to about 95 mole percent ethylene, and conversely about 90 to about 5 mole percent of the second moiety. The ethylene is preferably copolymerized with propylene or butene-1. In the case of propylene, the mole ratio is most preferably within the range of about 20% to about 40% propylene and about 80% to about 60% ethylene. One such material is sold by Mitsui Petrochemical Industries, Ltd. as TAFMER P. In the case of butene-1, the mole ratio is most preferably within the range of about 85% to about 95% ethylene, and about 15% to about 5% butene-1. One such material is sold by Mitsui Petrochemical Industries, Ltd. as TAFMER A. Tafmer P is elastomeric. Tafmer A provides some properties representative of elastomers, as seen in the following EXAMPLES herein.

The third component may be any of the known and readily available elastomeric polymers, or an EBC, indeed even blends thereof. Examples of readily available elastomeric polymers are polybutylene, polyisobutylene, ethylene propylene diene monomer terpolymer, styrene butadiene styrene copolymer, styrene ethylene butylene styrene copolymer, styrene isoprene styrene copolymer, polybutene-1, and isobutylene isoprene copolymer.

The third component is not, however, the same as the second component, as such would effectively make a two-component blend, rather than a three component blend as defined in the invention.

The polypropylene which is used as the first component of the blend provides strength to the sheet structure as well as the capability to withstand high temperature without excessive softening. The inclusion of the second and third components in the blend composition provides resilience to the blend composition.

Any of the polypropylenes may be used in the first component of the blend. Polypropylenes which are copolymers having about 2 to about 8 mole percent ethylene are preferred, as the copolymer provides some minimum level of additional resilience to the polypropylene, as compared to a homopolymer. The term "polypropylene" as used herein is intended to include homopolymers and copolymers except where specified otherwise. Whether the polypropylene is a homopolymer or copolymer, its resilience as demonstrated herein, whether having been retort processed, or not retort processed, is enhanced substantially by the incorporation of the second and third components. Without the incorporation of the second and third components, the polypropylene is at least somewhat rigid, whether homopolymer or copolymer.

For example, a blend of 60% by weight of the polypropylene and 40% polyisobutylene is superior to the same polypropylene when tested in unblended composition, as measured in free fall drop tests of the packages. But these packages with polyisobutylene will fail, at a 9 foot drop with the failure being by rupture through the package wall adjacent a heat seal.

By comparison, packages were made using single-layer film whose composition was 60% by weight of the same polypropylene copolymer, 20% TAFMER A and 20% polyisobutylene for the same total weight of 40% by weight elastomer as in the above packages using two-component blends. The resulting packages passed the 9 foot drop tests, which passage was not found for either of the 2-component blends.

While polypropylene homopolymer is fully satisfactory for many uses, the polypropylene copolymer is preferred, as it evidences the optimum properties of improved resistance to shock abuse in combination with the capability to withstand elevated processing temperatures. Optimum performance is generally seen, then, in blends of polypropylene copolymer with the second and third components.

While the polypropylene may be present in an amount of about 10% to about 95% by weight, a generally preferred range is about 40% to about 70%. A lower level of about 40% is generally preferred in order to maintain at least a minimal degree of the high heat temperature tolerance of the composition, and a significant moisture vapor barrier, which are provided by polypropylene. An upper level of 70% is generally desired.

While the incorporation of virtually any amount of the second component into the blend composition will provide some benefit, generally, improvements are first evident at a level of about 2% by weight. And while up to about 70% of the second component may be used, the most desired balance of properties is achieved when the second component is present in an amount of about 5% to about 35%.

Likewise, while the incorporation of virtually any amount of the third component into the blend composition will provide some benefit, generally, improvements are first evident at a level of about 2% by weight. And while up to about 60% of the third component may be used, the most desired balance of properties is achieved when the third component is present in an amount of about 10% to about 40%.

The inter-relationship among the three components is a mystery, in that the use of the second and third components as defined herein may provide a blend having superior properties as compared to the prior art. For whatever unexplained reason, the most preferred family of compositions of the invention is that where each of the components is within its preferred range of compositions; namely about 40% to about 70% polypropylene, about 5% to about 35% of the second component, and about 10% to about 40% of the third component.

Thus it is seen that the invention provides novel material blend compositions. The invention further provides single layer films and multiple layer films and sheet structures for use in making packages. Indeed, the invention provides heat sealed packages capable of withstanding substantial amounts of physical shock type abuse, which capability is especially noticeable after the closed and sealed packages have been subjected to elevated temperatures of up to about 250° F.

Having thus described the invention, what is claimed is:

1. A mulitple layer sheet structure, comprising:
   (a) a first layer of metal foil having two opposing surfaces on opposing sides of said foil layer;
   (b) a second layer of an abuse resistant polymer adhered to one said surface on one said side of said foil; and
   (c) a third layer adhered to said sheet structure on the other said side of said foil layer, the composition of said third layer being a blend of (i) as a first component, a polypropylene polymer, (ii) as a second component, a polymeric composition providing elastomeric properties, and chosen from the group consisting of ethylene butene-1 copolymer and ethylene propylene copolymer, and (iii) as a third component, a third polymeric composition providing elastomeric properties and selected from the group consisting of ethylene butene-1 copolymer, ethylene propylene copolymer, polybutylene, polyisobutylene, ethylene propylene diene monomer terpolymer, styrene butadiene styrene copolymer, styrene ethylene butylene styrene copolymer, styrene isoprene styrene copolymer, polybutene-1, and isobutylene isoprene copolymer.

2. A mutliple layer sheet structure as in claim 1 wherein said third component is present in a amount of 10% to about 40% by weight of the overall composition of said blend.

3. A multiple layer sheet structure as in claim 1, said second component comprising a copolymer of about 85 to about 95 mole percent ethylene and about 15 to about 5 mole percent butene-1.

4. A multiple layer sheet structure as in claim 2, said second component comprising a copolymer of about 85 to about 95 mole percent ethylene and about 15 to about 5 mole percent butene-1.

5. A multiple layer sheet structure as in claim 1, said second component comprising a copolymer of about 60 to about 80 mole percent ethylene and about 40 to about 20 mole percent propylene.

6. A multiple layer sheet structure as in claim 2, said second component comprising a copolymer of about 60 to about 80 mole percent ethylene and about 40 to about 20 mole percent propylene.

7. A multiple layer sheet structure, comprising:
(a) a first layer of a polyamide having two opposing surfaces on opposing sides of said polyamide layer;
(b) a second layer of an ethylene vinyl alcohol copolymer having two opposing surfaces, one said surface of said second layer being on one said surface on one said side of said first layer;
(c) a third layer of a polyamide on the other said surface of said second layer opposite said first layer; and
(d) a fourth layer adhered in said sheet structure to the other said side of said first layer, the composition of said fourth layer being a blend of (i) as a first component, a polypropylene, (ii) as a second component, a polymeric composition providing elastomeric properties and chosen from the group consisting of ethylene butene-1 copolymer and ethylene propylene copolymer, and (iii) as a third component, a third polymeric composition providing elastomeric properties and selected from the group consisting of ethylene butene-1 copolymer, ethylene propylene copolymer, polybutylene, polyisobutylene, ethylene propylene diene monomer terpolymer, styrene butadiene styrene copolymer, styrene ethylene butylene styrene copolymer, styrene isoprene styrene copolymer, polybutene-1, and isobutylene isoprene copolymer.

8. A multiple layer sheet structure as in claim 7 wherein said third component is present in an amount of about 10% to about 40% by weight of the overall composition of said blend.

9. A multiple layer sheet structure as in claim 7, said second component comprising a copolymer of about 85 to abou 95 mole percent ethylene and about 15 to about 5 mole percent butene-1.

10. A multiple layer sheet structure as in claim 8, said second component comprising a copolymer of about 85 to about 95 mole percent ethylene and about 15 to about 5 mole percent butene-1.

11. A multiple layer sheet structure as in claim 7, said second component comprising a copolymer of about 60 to about 80 mole percent ethylene and about 40 to about 20 mole percent propylene.

12. A multiple layer sheet structure as in claim 8, said second component comprising a copolymer of about 60 to about 80 mole percent ethylene and about 40 to about 20 mole percent propylene.

13. A multiple layer sheet structure comprising:
(a) a first layer of a barrier material having two opposing surfaces on opposing sides of said first layer, the composition of said first layer being a vinylidene chloride copolymer;
(b) a second layer of an abuse resistant polymer adhered to one said surface on one said side of said first layer; and
(c) a third layer adhered, in said sheet structure, on the other said side of said first layer, the composition of said third layer being a blend of (i) a first component of polypropylene, (ii) as a second component, a polymeric composition providing elastomeric properties, and chosen from the group consisting of ethylene butene-1 copolymer and ethylene propylene copolymer, and (iii) as a third componet, a third polymeric composition providing elastomeric properties and selected from the group consisting of ethylene butene-1 copolymer, ethylene propylene copolymer, polybutylene, polyisobutylene, ethylene propylene diene monomer terpolymer, styrene butadiene styrene copolymer, styrene ethylene butylene styrene copolymer, styrene isoprene styrene copolymer, polybutene-1, and isobutylene isoprene copolymer.

14. A multiple layer sheet structure as in claim 13 wherein said third component is present in an amount of about 10% to about 40% by weight of the overall composition of said blend.

15. A multiple layer sheet structure as in claim 13, said second component comprising a copolymer of about 85 to about 95 mole percent ethylene and about 15 to about 5 mole percent butene-1.

16. A multiple layer sheet structure as in claim 14, said second component comprising a copolymer of about 85 to about 95 mole percent ethylene and about 15 to about 5 mole percent butene-1.

17. A multiple layer sheet structure as in claim 13, said second component comprising a copolymer of about 60 to about 80 mole percent ethylene and about 40 to about 20 mole percent propylene.

18. A multiple layer sheet structure as in claim 14, said second component comprising a copolymer of about 60 to about 80 mole percent ethylene and about 40 to about 20 mole percent propylene.

19. A package made with a sheet structure of any one of claims 1–18.

* * * * *